United States Patent [19]

Miller et al.

[11] Patent Number: 4,537,502
[45] Date of Patent: Aug. 27, 1985

[54] MULTIPLE DISCRETE FREQUENCY RANGING WITH ERROR DETECTION AND CORRECTION

[75] Inventors: Dale D. Miller, Seattle; John N. Polky, Kent, both of Wash.

[73] Assignee: The Boeing Company, Seattle, Wash.

[21] Appl. No.: 428,550

[22] Filed: Sep. 30, 1982

[51] Int. Cl.³ .................. G01C 3/08; G01S 13/38; G06F 7/72
[52] U.S. Cl. .................... 356/5; 343/12 R; 343/17.5; 343/14; 364/746
[58] Field of Search .......... 343/14, 12 R, 17.2 R, 343/17.5; 364/746; 356/5

[56] References Cited

U.S. PATENT DOCUMENTS

| | | | |
|---|---|---|---|
| 3,277,473 | 10/1966 | Calhoon et al. | 343/5 DP |
| 3,487,406 | 12/1969 | Howard | 343/7.3 |
| 3,503,068 | 3/1970 | Yamauchi | 343/5 DP |
| 3,646,588 | 2/1972 | Popta et al. | 343/7.3 |
| 3,649,123 | 3/1972 | Ulicki | 356/5 |
| 3,718,927 | 2/1973 | Howard et al. | 343/7.4 |
| 3,728,025 | 4/1973 | Madigan et al. | 356/5 |
| 3,858,208 | 12/1974 | Parke et al. | 343/7.5 |
| 3,900,261 | 8/1975 | Wingate | 356/5 |
| 3,950,750 | 4/1976 | Churchill et al. | 343/17.5 |
| 4,040,055 | 8/1977 | Donahue et al. | 343/7.7 |
| 4,093,949 | 6/1978 | Evans | 343/7 A |
| 4,102,572 | 7/1978 | O'Meara | 356/5 |
| 4,106,019 | 8/1978 | Alexander | 343/9 |
| 4,217,581 | 8/1980 | Prickett | 343/7.3 |
| 4,219,812 | 8/1980 | Rittenbach | 343/7.3 |
| 4,229,102 | 10/1980 | Wiklund et al. | 356/5 |
| 4,320,397 | 3/1982 | Frosch et al. | 343/7.5 |

OTHER PUBLICATIONS

F. J. Taylor, "Residue Arithmetic: A Tutorial with Examples", May 1984, Computer, pp. 50–62.
Skolnik, Merrill I., "Radar Handbook", Chapter 19, McGraw-Hill, New York, 1970.
Szabo, Nicholas S., et al., "Residue Arithmetic and its Applications to Computer Technology", SS2-4 & 3-6, McGraw-Hill, New York, (1967).

Primary Examiner—S. C. Buczinski
Assistant Examiner—Gilberto Barròn, Jr.
Attorney, Agent, or Firm—Schwartz, Jeffery, Schwaab, Mack, Blumenthal & Evans

[57] ABSTRACT

A range determination apparatus for determining target range within a range depth of D and within a range bin error of e comprises a carrier frequency transmitter for transmitting a carrier frequency and a generator for generating at least two modulating signals having frequency $f_1$ and $f_2$, respectively. A modulation device, operative for at least two discrete frequencies for providing one of simultaneous or sequential modulated signals, is coupled to the carrier frequency transmitter for modulating the carrier. The two modulating frequencies and a common sub-multiple counting frequency are related such that $f_o = m_1'f_1 = m_2'f_2$. A receiver is provided for receiving a reflected signal from the target and for producing a corresponding received electrical signal. A phase detection device is responsive to the modulating signals of the generator and the received signals for detecting the phase difference $x_1'$ and $x_2'$, respectively, between the modulating signals of the frequencies and each of the corresponding received signals. A data processor is coupled to receive the detected phase differences for each of the received signals.

9 Claims, 6 Drawing Figures

MULTIPLE DISCRETE FREQUENCY RANGING WITH ERROR DETECTION AND CORRECTION

BACKGROUND OF THE INVENTION

1. Field of the Invention

The invention is in the field of radar ranging and more particularly in the field of error detection and correction in plural frequency ranging radar systems. The invention has application, for example, in guidance systems, laser surveying and automatic camera focusing apparatus.

2. Description of the Prior Art

Radar ranging devices are based upon measurements of phase differences between transmitted and received signals. Such systems suffer from measurement ambiguities resulting from the fact that phase is a multivalent function. In using high pulse repetition frequencies (PRF) in which the target range is greater than the equivalent distance between transmitted pulses, it is uncertain as to which transmitted pulse with which the received pulse is to be correlated. Multiple pulse repetition frequencies have been utilized to modulate the transmitted signal in order to associate the return signal with the proper transmitted signal thus removing the ambiquity. Multiple, fixed PRF's have been used to obtain accurate range data wherein sequential measurements of the ambigious range corresponding to each PRF are obtained and compared to obtain the common range bin defining the range unambigiously. The PRF's are chosen to have a common submultiple frequency. Range uniqueness is assured for certain pairwise relatively prime harmonics of the counting frequency by the Chinese Remainder Theorem.

Reference is made to several prior art references, incorporated herein by reference, namely *Radar Handbook*, by M. Skolnik, McGraw-Hill (1970), Chapter 19 and especially Section 19.3 and U.S. Pat. Nos. 3,277,473, 4,106,019 and 3,649,123.

In making the range measurement for each PRF, small errors in any of the measured phase shifts can give rise to catastrophic errors in the synthesized or decoded range. Wide objects which fill several range gates can also yield several valid phase measurements for each frequency, and thus yield widely different (and incorrect) decoded ranges. Such range measurement errors develop not only in PRF systems, but in systems using other forms of modulation such as amplitude modulation, pulse-width modulation, and frequency modulation. The present invention uses amplitude modulation as an exemplary embodiment.

SUMMARY OF THE INVENTION

It is an object of the invention to provide a new and improved ranging apparatus and method to detect and correct errors in prior art systems and methods.

Another object of the invention is to provide a radar ranging apparatus and method which is applicable to detect and correct small measurement errors in multiple discrete PRF ranging devices.

Yet another object of the invention is to provide an improved ranging apparatus for use, for example, in aircraft or rocket guidance systems, laser surveying or automatic camera focusing devices.

A further object of the invention is to provide a radar ranging device and method applicable to obtain accurate and unambiguous range data during relatively short dwell times, as for example, in the order of 5 microseconds/pixel at distances on the order of 500–5,000 ft and at resolutions on the order of about 1 ft. Such measurements are preferably, but not necessarily, obtained using only two modulating frequencies in a discrete PRF system.

The invention is directed toward a range determination apparatus for determining target range within a range depth of D and within a range bin error of e. I.e., it is assumed that the error in measuring the mismatch of the return echo relative to the modulated frequency is no more than e range bins, where the length of the range bin is defined as one-half the wavelength of the counting frequency. The apparatus comprises (a) a carrier frequency transmitter for transmitting a carrier frequency (b) means for generating at least two modulating frequencies $f_1$ and $f_2$, (c) means coupled to the carrier frequency transmitter for modulations of the carrier either simultaneously or sequentially, (d) means to receive the reflected signals from the target, (e) means for filtering the $f_1$ and $f_2$ frequencies from the received signal, (f) means for detecting the phase differences $x_1'$, $x_2'$ (measured in integral counts of the period of the counting frequency $f_o$) between the modulating frequencies $f_1$ and $f_2$ and each of the corresponding filtered signals, and (g) data processing means for processing the phase difference signals to obtain the true target range. The at least two modulating signals are related to one another such that $$f_o = m_1' f_1 = m_2' f_2$$

where $$m_1' = m_1 m_r$$

$$m_2' = m_2 m_r$$

$$m_r \geq 4e + 1$$

$$m_1 m_2 \geq D/m_r$$

and where $m_1$, $m_2$ and $m_r$ are pairwise relatively prime. $f_o$ is the counting frequency. The data processing means is operative (1) to calculate $$R(x_1')_{m_1}, R(x_2')_{m_2}$$
$$R(x_1')_{m_r}, R(x_2')_{m_r}, \text{ where } R(x)_m \text{ is}$$

where $R(x)_m$ is defined as the residue of x modulo m.

(2) to compare $R(x_1')_{m_r}$ with $R(x_2')_{m_r}$ and if unequal to modify at least one of $x_1'$ and $x_2'$ by adding or subtracting an integer $\leq e$ to produce modified phase differences $x_1''$ and $x_2''$ so that residues $R(x_1'')_{m_r}$ and $R(x_2'')_{m_r}$ of the modified phase differences are equal, and (3) to decode one of (1) the residue number triplet $[R(x_1')_{m_1}, R(x_2')_{m_2}, R(x_1')_{m_r}]$ and (2) the modified residue number triplet $[R(x_1'')_{m_1}, R(x_2'')_{m_2}, R(x_1'')_{m_r}]$ relative to the module set $[m_1, m_2, m_r]$ to obtain the true target range.

BRIEF DESCRIPTION OF THE DRAWINGS

The invention is described in relation to the preferred embodiment and the figures wherein.

DETAILED DESCRIPTION OF PREFERRED EMBODIMENTS

Figure 1:
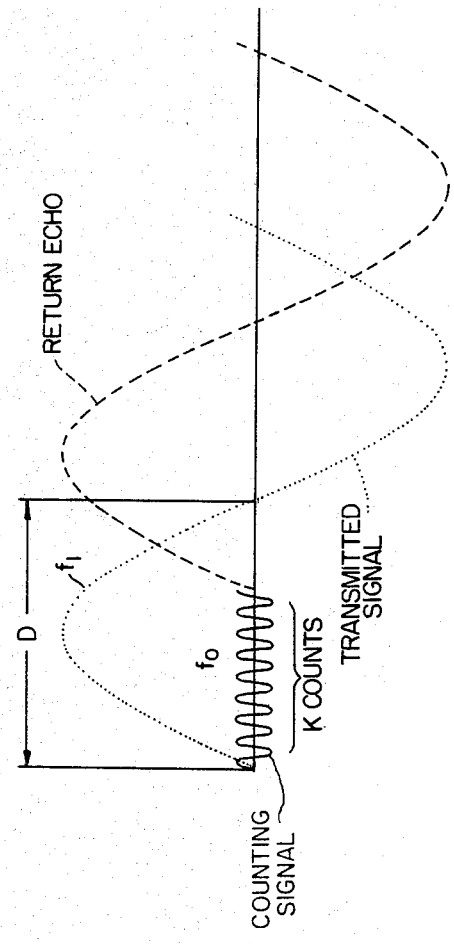
FIG. 1 shows the phase shift between a transmitted and return echo signal.

The background principles for understanding the invention may be described with reference to FIGS. 1 and 2. FIG. 1 illustrates graphs of the transmitted and received echo signals. A continuous waveform is shown in FIG. 1 although the same principles apply to pulsed waveforms. The transmitted signal having a frequency $f_1$ is used to modulate a carrier signal and is selected to have a frequency which is a sub-multiple of a counting frequency $f_o$. The counting frequency is used to count the phase difference between the transmitted and returned echo signal. For example, $f_o = m\, f_1$, where m is an integer, e.g. 250. In FIG. 1, the pulse difference between the transmitted and returned signal is measured to be k periods of the counting frequency $f_o$. A range gate or bin has depth $c/2f_o$, and the gates are numbered consecutively from the source beginning with range bin 0. For the k counts shown, the target range bin, defined as x, satisfies the relation $$x \equiv k \ (\text{modulo } m).$$

Thus targets who range gates differ by a multiple of m are indistinguishable, and the measurement k is known as an ambiguous range measurement. In FIG. 2, for example, the upper and middle charts shows the choices for range bins possible assuming a modulating frequency, $f_o = 5 f_1$ with a measured phase difference $k=3$. It may be seen that the true range bin can not be determined from the possible choices of 3, 8, 13, 18, 23 or 28. Averaging repeated measurements of the phase shift (using, e.g., zero crossing detection or quadrature detection) reduces signal noise, thus increasing the confidence of the measurement. However, the range ambiguity remains.

One type of conventional laser ranging which removes range ambiguity assumes a maximum detection distance D and commences by amplitude modulating the signal at a frequency $f_1$ of wavelength $\lambda \geq 2D$, with a counting frequency $f_1' = N f_1$ for some integer N, typically $N=256$. This partitions [O,D] into N equal range bins, and the phase measurement unambiguously determines the range bin of the target. To improve the range resolution, the process is repeated with higher frequencies:

$$f_2 = N f_1$$

$$f_2' = N f_2$$

(the new counting frequency) and, in general, $$f_i = N f_{i-1}$$

$$f_i' = N f_i,$$

repeated until the resolution specifications are met.

A disadvantage of such systems are their limited applicability. For example, if it is desirable to measure target range over an interval between 500 and 5,000 feet with a 5 microsecond dwell time per pixel and an accuracy of 1 foot, the conventional ranging system would select the first or lowest frequency modulation to have a wavelength of $2D = 2\,(5{,}000-500) = 9000$ feet. The period for such a wavelength is about 9 microseconds which exceeds the 5 microsecond desired dwell, so that the conventional system is inapplicable.

Figure 2:
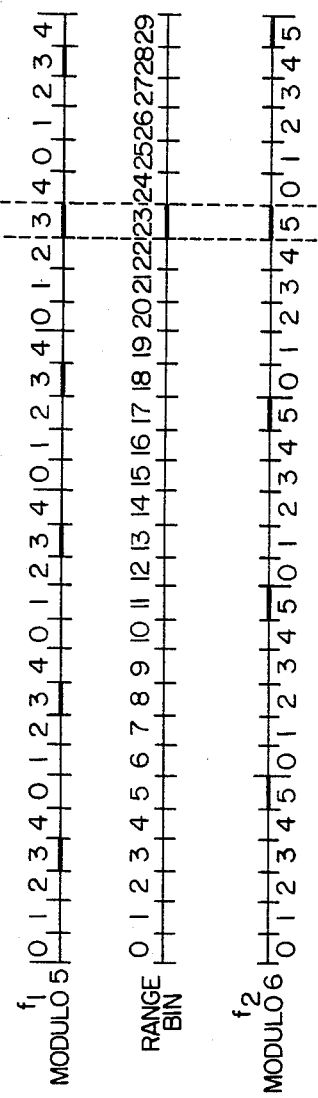
FIG. 2 illustrates a range bin timing chart for the determination of unambiguous ranges in a multiple discrete PRF ranging system.

The present invention is based upon another prior art technique, namely, the multiple discrete PRF ranging technique also illustrated in reference to FIGS. 1 and 2. Given a desired distance resolution (or maximum distance error) $d_0$, the counting frequency $f_0$ is chosen such that $\lambda_0 = c/f_0 = 2d_0$. Modulation frequencies $f_1, f_2, \ldots, f_s$ are chosen so that $f_0 = m_i f_i$, where the $m_i$ are pairwise relatively prime integers. Phase measurements $k_1, \ldots, k_s$ are performed as described above, and, if no measurement errors occur, the true range bin x satisfies $$k_i \equiv x_i \ (\text{modulo } m_i) - (i=1,2,\ldots,s).$$

The Chinese Remainder Theorem asserts the existence of a unique integer x, $$0 \leq x < \prod_{i=1}^{s} m_i,$$

satisfying this system of congruences; and hence the range for any target in the bins numbered 0 up to (but not including)

$$\prod_{i=1}^{s} m_i$$

can be unambiguously determined.

An example of known multiple discrete PRF ranging is given as follows. Let $f_o, f_2$ be chosen such that $f_o = 5 f_1 = 6 f_2$. Assume the phase measurements yield 3 for the PRF of $f_1$ and 5 for the PRF of $f_2$ establishing the following pair of congruences for the range bin x:

$$x \equiv 3 \ (\text{mod } 5)$$

$$x \equiv 5 \ (\text{mod } 6).$$

According to the Chinese Remainder Theorem, there exist a unique integer between 0 and 29 $(5 \times 6 - 1)$ which satisfies the simultaneous consequences.

Decoding schemes exist to determine the unique number but the answer may readily be seen by reference to FIG. 2. The measured phase shifts of 3 for the f, (modulo 5) transmission lines up with the measured phase shift of 5 for the $f_2$ (modulo 6) transmission at only one range bin within the poissible ranges of 0–29, namely range bin 23. Thus, the measured target range is determined unambigiously.

The difficulty with conventional multiple discrete PRF ranging, and the problem to which the invention is directed, is illustrated using the same example as above. Now, however, it is assumed that there is a measurement error so that the phase difference for the modulation frequency $f_1$ is measured to be 2 instead of 3, e.g. a phase error of one range bin. Thus, $$x \equiv 2 \ (\text{mod } 5) \ (\text{incorrect measurement})$$

-continued $x \equiv 5 \pmod{6}$ (correct measurement).

From FIG. 2 the results can be seen that the range bin 17 provides the only unique solution to the above two congruences for values $0 \leq x < 29$. Range bin 17, however, is a large error from the true range bin 23. It may thus be appreciated that a fundamental problem in prior art ranging is that small measurement errors (i.e., one bin, for example) can result in large or even catastrophic errors in the range bin result. The problem is even more acute when one realizes that such phase measurement errors are to be expected since basically, the measurement of phase forces a continuous range value into one of a finite plurality of discrete bins. Such discretization can easily cause measurement errors. The invention is associated with and implemented by a choice of discrete frequencies and associated moduli for a ranging system; hence, the invention is not simply an "add-on" to an existing system. While the preferred form of the laser system uses only two frequencies, the technique is applicable to and is described for arbitrarily many frequencies. The transmitted signal can either be simultaneously modulated at all frequencies (as in the preferred laser system) or the frequency modulations and phase measurements can be sequentially performed.

The notation $R(x)_m$ will denote the residue of x modulo m. For $x \geq 0$, $R(x)_m$ is the remainder upon dividing x by m. A more general definition which applies to negative as well as positive integers x is as follows: $R(x)_m$ is the unique integer in the interval $0 \leq R(x)_m < m$ for which $x - R(x)_m$ is a multiple of m. The notation $A(x)$ will be used to denote the absolute value of x.

The ranging technique in accordance with the invention requires the following two propositions. Proposition 1 is well known and is stated without proof.

Proposition 1. If the m and n are integers with n a multiple of m, then for any integer x, $$R(x)_m = R(R(x)_n)_m.$$

Proposition 2. If the x, y, and m are integers such that $A(x-y) \leq (m-1)/2$, then $A(x-y) = \min(R(x-y)_m, m-R(x-y)_m)$.

Proof. if $x \geq y$, $A(x-y) = x - y$
$= R(x-y)_m$
Also, if $x < y$, $A(x-y) = y - x$
$= R(y-x)_m$
$= m - R(x-y)_m$.

Since $A(x-y) \leq (m-1)/2$ and exactly one of the two values $R(x-y)_m$ and $m - R(x-y)_m$ is no greater than $(m-1)/2$, $A(x-y)$ must equal the smaller of these two values.

Also used throughout the discussion is the fundamental fact upon which the Residue Number System (RNS) is based: a sum, difference, or product of integers which is then reduced modulo m is congruent (modulo m) to the sum, difference, or product, respectively, of their modulo m residues.

Choice of frequencies and moduli

Assume is frequencies are to be used and the maximum absolute bin error in measuring the ambiguous range bins is an integer $e \geq 0$. As will be seen, the decoded range bin will differ from the true distance by no more than e bins. Let D represent the total range depth desired. For example, in the preferred laser system: $s=2$, $e=1$, $D=4500$ feet, and the decoded distance will have an error of at most 1 foot, which is the length of one range bin.

Let $m_r$ be an integer satisfying $m_r \geq 4e+1$, and choose integers $m_1, m_2, \ldots, m_s$ which are pairwise relatively prime, each relatively prime to $m_r$, and $$\prod_{i=1}^{s} m_i \geq D/m_r.$$

The modulus $m_r$ will be incorporated as a redundant modulus, but no redundant frequency need be associated with it. Next, let $m_i' = m_i m_r$, $i = 1 \ldots, s$. Given the counting frequency $f_0$, the discrete frequencies $f_i$, $i = 1 \ldots, s$ are chosen so that $$f_0 = m_1' f_1 = m_2' f_2 = \ldots = m_s' f_s$$

Let x represent the true range bin for the target, and let $x_i'$ represent the ambiguous range measurements corresponding to $f_i$, $i = 1, \ldots, s$. If no measurement errors are encountered, then $x_i' = R(x)_{m_i'}$ for $i = 1, \ldots, s$. Proposition 1 then implies that $$R(x_1')_{m_r} = R(x_2')_{m_r} = \ldots = R(x_s')_{m_r}$$

since each $m_i'$ is a multiple of $m_r$. Since errors are assumed, the measured values $x_i'$ actually have the form $$x_i' = R(x+a_i)_{m_i'}$$

for unknown integers $a_i$ with $A(a_i) \leq e$. The s-tuple $(x_1', x_2', \ldots, x_s')$ represents legitimate range bin if and only if the values $R(x_i')_{m_r}$ are all equal. This implies $a_1 = a_2 = \ldots = a_s$ and the values $(R(x_1')_{m_1}, R(x_2')_{m_2} \ldots R(x_s')_{m_s}, R(x_i')_{m_r})$ are decoded relative to the moduli set $(m_1, m_2, \ldots, m_s, m_r)$, yielding $x+a$ for the computed range bin (differing from the true range bin by no more than (e)), where a is the common value of the $a_i$.

If a legitimate range bin is not found, an error is detected, and the procedure for error correction is given by the following five steps.

Step 1

Compute $$x_i = R(x_i')_{m_i} (= R(x+a_i)_{m_i})$$

and $$x_i^r = R(x_i')_{m_r} (= R(x+a_i)_{m_r}) \text{ for } i=1,2,\ldots,s.$$

These computations may be performed via table lookup with programmable read only memories (PROMs). The moduli set $(m_1, m_2, \ldots, m_s, m_r)$ will form the basis for decoding once the corrected residue relative to each modulus is determined.

Step 2

For each distinct pair of indices i,j, $i = 1, 2, \ldots, s$, $j = 1, 2, \ldots, s$, compute $$d(i,j) = \min(R(x_i^r - x_j^r)_{m_r}, m_r - R(x_i^r - x_j^r)_{m_r})$$

and choose $i_0, j_0$ at which $d(i_0, j_0)$ is maximal.

By Proposition 2, $d(i_0, j_0)$ is the maximum absolute difference between any pair of unambiguous range values $(x+a_i)$ and $(x+a_j)$.

Step 3

Choose an integer y, $0 \leq y < m_r$ as follows:

$$y = R(x_{j0}{}^r) + [R(x_{i0}{}^r - x_{j0}{}^r)_{m_r}/2])_{m_r} \text{ if}$$
$$R(x_{i0}{}^r - x_{j0}{}^r)_{m_r} \leq 2e, \quad (a)$$

$$y = R(x_{i0}{}^r) + [R(x_{j0}{}^r - x_{i0}{}^r)_{m_r}/2])_{m_r} \text{ if}$$
$$R(x_{j0}{}^r - x_{i0}{}^r)_{m_r} \leq 2e, \quad (b)$$

where [ ] denotes the greatest integer function.

By Proposition 2 and the assumption that $A(a_i) \leq e$, either the hypothesis of (a) or (b) must hold. Also, the quantities within the greatest integer functions are no greater than e. Conceptually, y has been chosen approximately midway "between" $x_{i0}{}^r$ and $x_{j0}{}^r$ in the ring of integers moduli $m_r$.

Step 4

Compute $b_i$, $i=1,\ldots,s$ according to $$b_i = R(x_i{}^r - y)_{m_r} \text{ if } R(x_i{}^r - y)_{m_r} \leq e, \text{ and}$$
$$b_i = R(x_i{}^r - y)_{m_r} - m_r \text{ if } R(x_i{}^r - y)_{m_r} > e.$$

Either $R(x_i{}^r - y)_{m_r} \leq e$ or $m_r - R(x_i{}^r - y)_{m_r} \leq e$, and hence $A(b_i) \leq e$. Next it is claimed that $a_i - b_i$ is a constant independent of i. Since $A(a_i) \leq e$, $-2e \leq a_i - b_i \leq 2e$. Since $m_r \geq 4e+1$ (which, in turn is greater than the length of the interval in which $a_i - b_i$ must lie), it suffices to show that $R(a_i - b_i)_{m_r}$ is a constant:

$$R(a_i - b_i)_{m_r} = R((x_i{}^r - b_i) - (x_i{}^r - a_i))_{m_r}$$
$$= R(y - x)_{m_r},$$

using the definitions of $b_i$ and $x_i'$ and Proposition 1.

Let $d' = a_i - b_i$ denote this common difference.

Step 5

Form the differences $x_i^* = R(x_i - b_i)_{m_i}$ and decode $(x_1^*, x_2^*, \ldots, x_s^*, y)$.

This decoded value is the unambiguous range bin and actually equals $x + d'$. To show this, it suffices to show that $$R(x + d')_{m_i} = x_i^* \quad (i = 1, \ldots, s)$$
$$\text{and}$$
$$R(x + d')_{m_r} = y.$$

For the former, $$R(x + d')_{m_i} = R(x + a_i - b_i)_{m_i}$$
$$= R(x_j - b_i)_{m_i}$$
$$= x_i^*,$$

and for the latter, $$R(x + d')_{m_r} = R(x + a_i - b_i)_{m_r}$$
$$= R(x_i{}^r - b_i)_{m_r}$$
$$= y.$$

It remains to show that $d' \leq e$, which verifies that the decoded unambiguous range bin differs from the true range bin by no more than e bins. Note that by Proposition 2, either $$x_{i0}{}^r, R(x_{i0}{}^r + 1)_{m_r}, R(x_{i0}{}^r + 2)_{m_r}, \ldots, x_{j0}{}^r$$

or $$x_{j0}{}^r, R(x_{j0}{}^r + 1)_{m_r}, R(x_{j0}{}^r + 2)_{m_r}, \ldots, x_{i0}{}^r$$

forms a set of no more than 2 e contiguous integers in the ring of integers modulo $m_r$ (considering $m_r - 1$ and 0 to be contiguous). This set must contain the integer y, which has been chosen in Step 3 to be no more than e positions from either endpoint. Also, this set must contain $R(x)_{m_r}$ (the modulo $m_r$ residue of the true range bin) which also must be no more than e positions from either endpoint. Hence y and $R(x)_{m_r}$ can be no more than e positions apart. Applying Proposition 2 twice, (once for $a_i$ and $b_i$, once for y and $R(x)_{m_r}$), it follows that $$A(d') = A(a_i - b_i) = A(y - R(x)_{m_r}) \leq e.$$

The following examples demonstrate the computational simplicity of the algorithm.

EXAMPLES

Assume the maximum measurement error e equals 1 range bin, so that $m_r = 4e + 1 = 5$. Let the total number of discrete frequencies (i.e., the number of moduli) be $s = 2$, and choose $m_1 = 7$, $m_2 = 11$. Then $m_1' = 35$, $m_2' = 55$, and range bins from 0 through $5 \times 7 \times 11 - 1 = 384$ can be unambiguously determined. Assume the true range bin for the target is $x = 215$.

(a) Measurement: $(x_1', x_2') = (5,50)$ (no error).
$$x_1 = R(5)_7 = 5 \quad x_2 = R(50)_{11} = 6$$
$$x_1{}^r = R(5)_5 = 0 \quad x_2{}^r = R(50)_5 = 0$$

Since $x_1{}^r = x_2{}^r$ the triple $(x_1, x_2, x_1{}^r) = (5,6,5)$ is decoded relative to the moduli set $(m_1, m_2, m_r)$ to obtain 215.

(b) Measurement: $(x_1', x_2') = (5,51)$ $$x_1 = R(5)_7 = 5 \quad x_2 = R(51)_{11} = 7$$

$$X_1{}^r = R(5)_5 = 0 \quad x_2{}^r = R(51)_5 = 1$$

Correction may proceed in one of two ways: (i) the integer 1 may be added to $x_1$ and $x_1{}^r$ and the triple $(6,7,1)$ decoded to obtain 216; or (ii) the integer 1 may be subtracted from $x_2$ and $x_2{}^r$ and the triple $(5,6,0)$ decoded to obtain 215. On the first instance, a small range error is obtained, and in the second case, no error is obtained. Another way to visualize the solution is to modify $x_1'$ and $x_2'$ by adding or subtracting an integer $\leq e$ to obtain $x_1''$ and $x_2''$ such that $R(x_1'')_{m_r} = R(x_2'')_{m_r}$. The triplet $R(x_1'')_{m_1}$, $R(x_2'')_{m_2}$ and $R(x_1'')_{m_r} = R(x_2'')_{m_r}$ is then decoded relative to the moduli set $(m_1, m_2, m_r)$.

(c) Measurement: $(x_1', x_2') = (6,51)$
$$x_1 = R(6)_7 = 6 \quad x_2 = R(51)_{11} = 7$$
$$x_1{}^r = R(6)_5 = 1 \quad x_2{}^r = R(51)_5 = 1$$

A legitimate range bin is found, and $(6,7,1)$ is decoded to 216 for an error of one range bin.

(d) Measurement: $(x_1', x_2') = (4,51)$
$$x_1 = R(4)_7 = 4 \quad x_2 = R(51)_{11} = 7$$
$$x_1{}^r = R(4)_5 = 4 \quad x_2{}^r = R(51)_5 = 1$$

A common value for $x_1{}^r$ and $x_2{}^r$ must be obtained by adding or subtracting 1 (since $e = 1$) to one or both values. Since $x_1{}^r + 1 = 0$ (mod 5) and $x_2{}^r - 1 = 0$ (mod 5), $(R(x_1 + 1)_7, R(x_2 - 1)_{11}, 0) = (5,6,0)$ is decoded to obtain 215, the true range bin.

A specific example applicable for the preferred system for a range depth of 4,500 feet with a dwell time of 5 microseconds with 1 foot resolution utilizes the following parameters. The counting frequency $f_o$ is approximately 492 MHz and a maximum one count error for each of the two frequencies gives $e=1$ with $m_r=5$. Additionally, one may select $m_1=19$, $m_2=49$ such that $m_1'=95$ and $m_2'=245$. The maximum range is then $m_r$ $m_1$ $m_2=4655$ and the modulating frequencies are given by $$f_1 = f_o/m_1' = 5.18 \text{ MHz}$$

$$f_2 = f_o/m_2' = 2.01 \text{ MHz}.$$

Another specific example applicable for yet another preferred embodiment uses a range depth of 2070 feet with a dwell time of 5 microseconds with 1 foot resolution and utilizes the following parameters. The counting frequency is approximately 463 MHz and a maximum two count error for each of the two frequencies gives $e=2$ and $m_r=10$. Additionally, one may select $m_1=9$, $m_2=23$ such that $m_1'=90$ and $m_1'=230$. The maximum range is then $m_r$ $m_1$ $m_2=2070$ and the modulating frequencies are given by $$f_1 = f_o/m_1' = 5.144 \text{ MHz}$$

$$f_2 = f_o/m_2' = 2.013 \text{ MHz}.$$

These specific parameters are utilized in the block diagram of FIG. 4. It is pointed out that the selection of two modulating frequencies in the preferred embodiment is made so as to enable use of conventional laser systems where power consumption demands make larger numbers of frequencies presently unpractical. However, with larger dwell times or laser systems employed in devices which have large power reserves, more than two frequencies may readily be used.

It may also be appreciated that use of the redundant modulus $m_r$ without the need for an extra transmitted redundant modulating frequency provides a distinct advantage of the present system over the prior art especially in environments where electrical power must be frugally employed. It is not absolutely necessary to select the modulating frequencies by choosing integers (viz., $m_r$, $m_1$, $m_2$, etc.) which are pairwise relatively prime. Integral multiples of the modlui (i.e., $k_1$ $m_1$ $m_r$, $k_2$ $m_2$ $m_r$, etc., for integers $k_1$, $k_2$; etc.) may also be used for the sake of selecting the modulating frequencies wherein $$f_o = f_1 k_1 m_1 m_r = f_2 k_2 m_2 m_r = \text{(etc.)}.$$

The data processing of the phase measurements $x_1'$, $x_2'$, etc., are first reduced modulo $m_1$ $m_r$, $m_2$ $m_r$, respectively, etc., and may then proceed as described above where the residue number representation is decoded with respect to the moduli set $(m_1, m_2, \ldots, m_r)$.

The process of decoding the triplets $(x_1, x_2, x_1^r)$ relative to the moduli set $(m_1, m_2, m_r)$ may be done using a mixed radix conversion process such as described in the test of Nicholas S. Szabo and Richard L. Tanaka, entitled *Residue Arithmetic and Its Applications to Computer Technology*, McGraw-Hill (1967), Section 3-6. Another section of the above text is of interest for its treatment of the Chinese Remainder Theorem namely Section 2-4. Yet another reference of interest for its teaching of redundant number systems for use in error detection and correction in digital filters, and its teaching of mixed radix digits and the redundant residue number system, is the publication of Mark H. Etzel and W. Kenneth Jenkins "Redundant Residue Number Systems for Error Detection and Correction in digital Filters," *IEEE Transactions in Acoustics, Speech, and Signal Processing*, Vol ASSP-28, No. 5, October 1980. Both of the publications are incorporated herein by reference.

Figure 3:
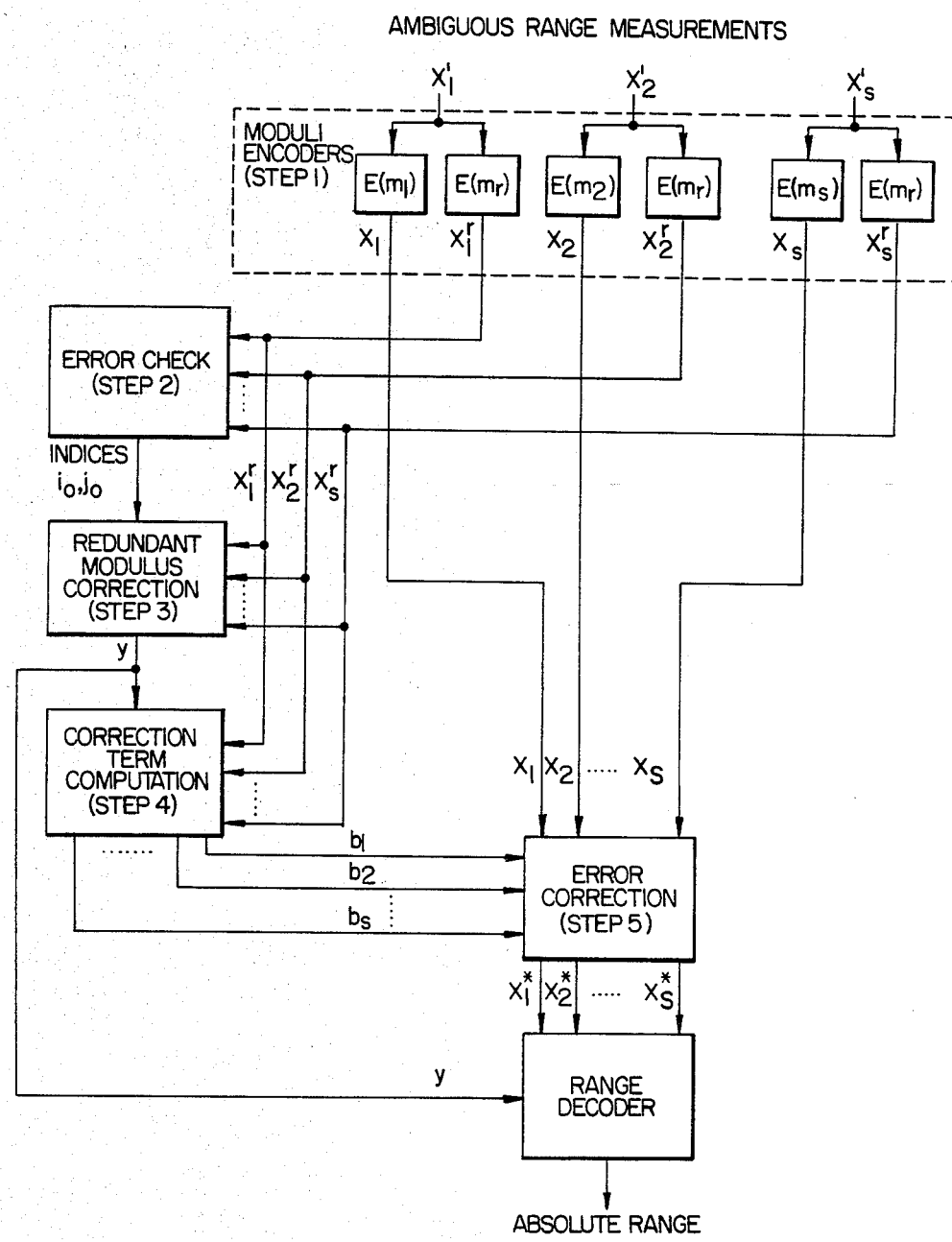
FIG. 3 is a flow chart showing the computation steps utilized as part of the ranging system of the invention.

A flowchart which illustrates the steps 1-5 discussed above is given in FIG. 3. Steps 1-5 as shown in the flowchart correspond to the steps 1-5 set forth above.

Figure 4A:
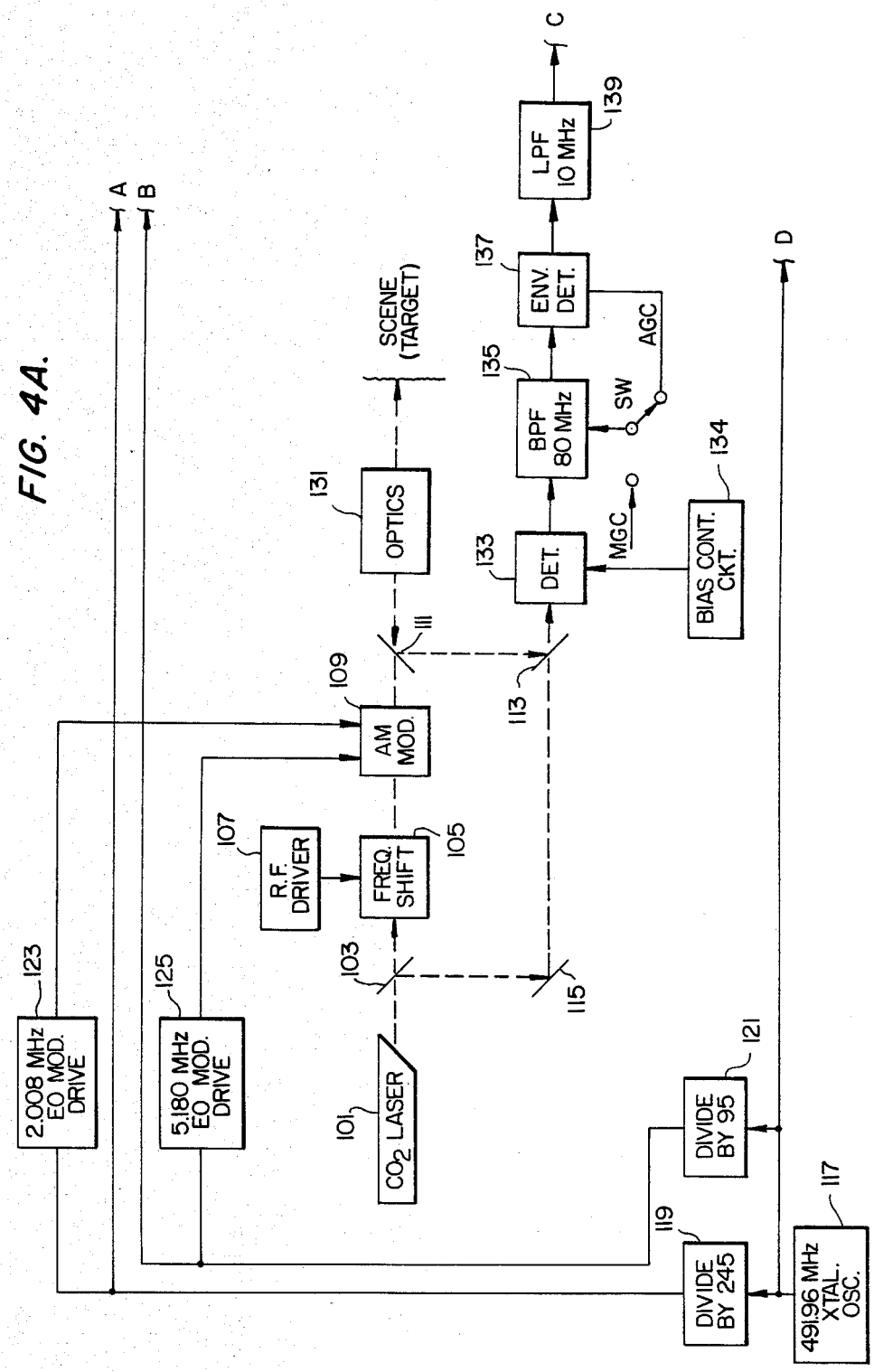
FIGS. 4A and 4B are block diagrams of a two frequency laser ranging system in accordance with the invention.
Figure 4B:
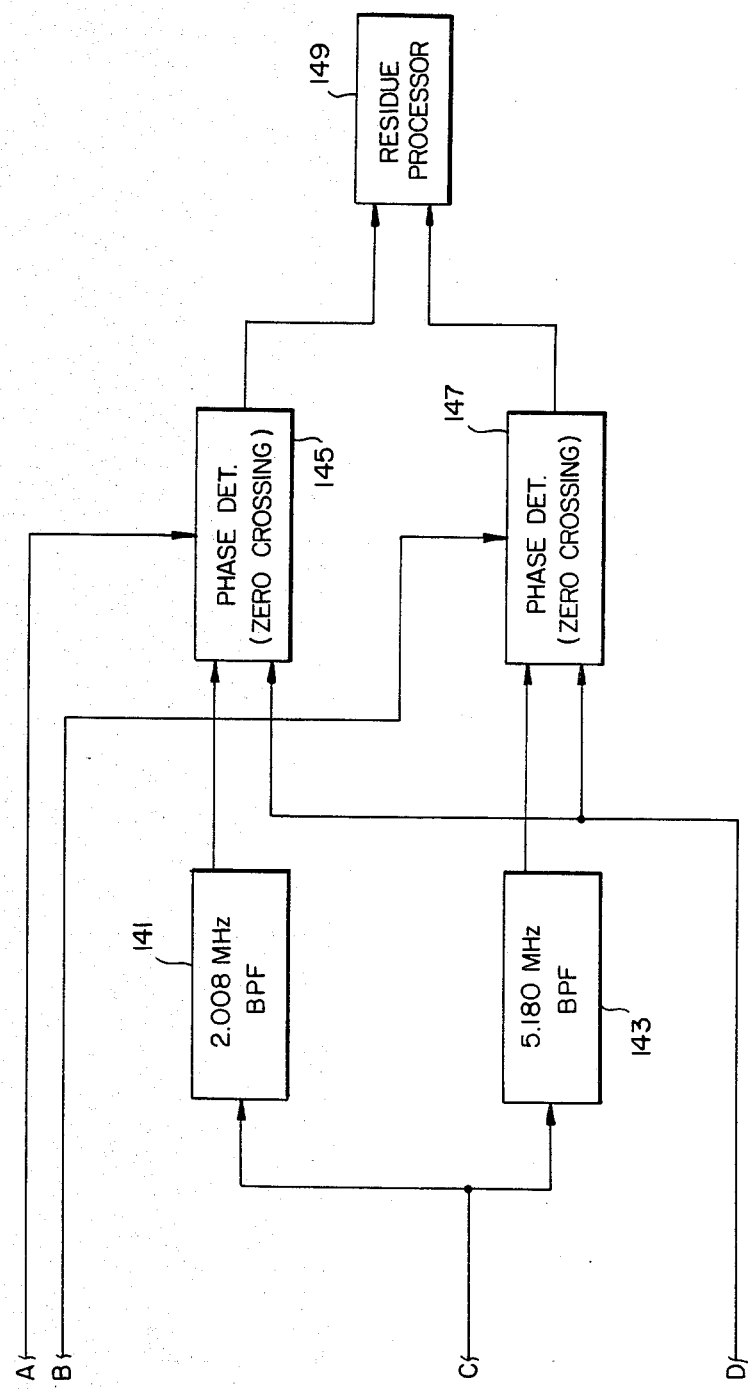
Figure 5:
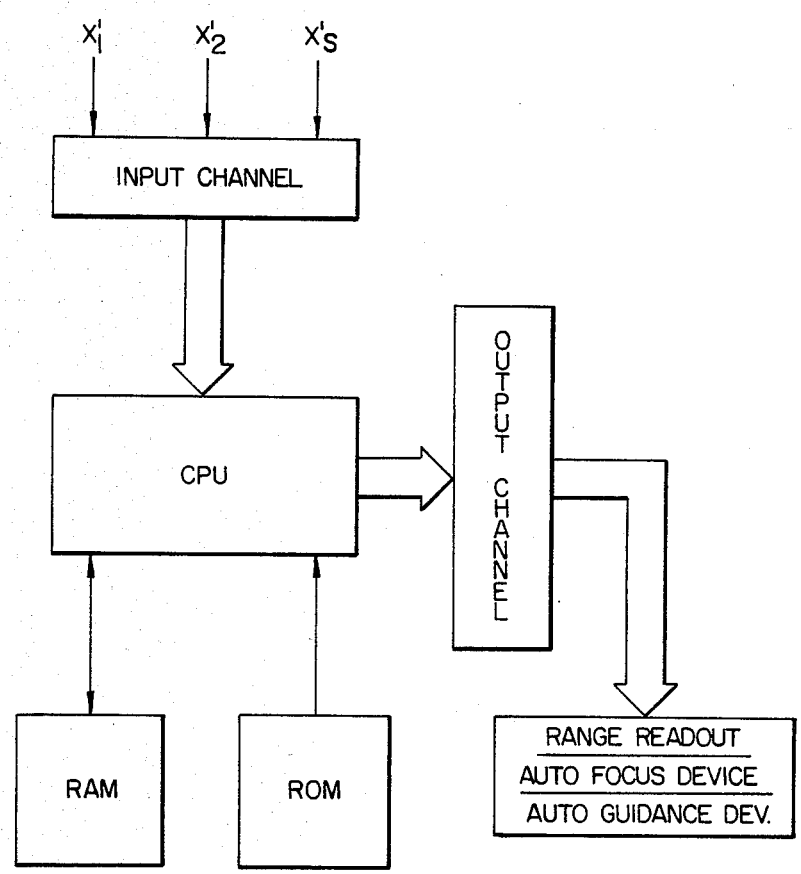
FIG. 5 is a block diagram of a digital processing embodiment for FIG. 3.

FIGS. 4 and 5 illustrate the hardware utilized in practicing the invention for a two frequency laser ranging system. The transmitting and receiving apparatus is seen to comprise a $CO_2$ laser 101, beam splitter 103, an acousto-optic frequency shifter 105, RF driver 107, electro optic AM modulators 109, beam splitters 111 and 113, mirror 115, and downstream detection, filtering and phase detection apparatus. The modulating frequencies of 2.008 MHz and 5.180 MHz are derived from a single 491.96 MHz (the counting frequency $f_o$) crystal oscillator source 117 via frequency divide circuits 119 and 121 respectively. The modulating frequencies are fed to respective electro optic modulator drive circuits 123 and 125 which in turn drive the electro optic AM modulator 109. In the preferred embodiment, simultaneous 2.008 MHz and 5.180 MHz modulations are applied due to the short dwell time and range parameters of the desired system. However, sequential modulation is clearly possible in a more general case. The acousto-optic frequency shifter 105 may be fabricated from two serially connected 40 MHz units with the R.F. driver 107 being operated at 40 MHz to provide a total frequency modulation of the lasar beam of 80 MHz. The $CO_2$ laser frequency is typically $3 \times 10^{13}$ Hz.

The beam splitter 103 serve to produce a local oscillator beam passing to mirror 115 and a transmitted beam passing through the acousto-optic frequency shifter 105 and the AM modulators 109. The transmitted beam passing straight through beam splitter 111 is thus frequency shifted by an amount $\pm 80$ MHz and AM modulated by the two frequencies $f_1 = 2.008$ MHz and $f_2 = 5.180$ MHz. Subsequent to passage through the beam splitter 111, the transmitted beam may pass through a convention beam expander, collimater optics and scanner all generally indicated at 131.

The return signal passes to beam splitter 111 and then to beam splitter 113 where it is combined with the unshifted local oscillator beam to produce a beat note at 80 MHz. The 80 MHz signal acts as an IF carrier to the $f_1$ and $f_2$ AM modulating frequencies.

The downstream detection, filtering and phase detection apparatus comprises a HgCdTe detector 133 (biased by a bias control circuit 134) which produces the modulated IF carrier signal, a 80 MHz center frequency bandpass filter 135, and a demodulating envelope detector 137. A switch SW is provided to enable automatic or manual gain control (AGC or MGC) as indicated. There is further provided a low pass filter 139 (10 MHz cutoff) and bandpass filters 141 and 143 with $f_1$ and $f_2$ as center frequencies respectively. The separate $f_1$ and $f_2$ signals are subsequently fed to respective zero crossing phase detectors 145 and 147. The phase detectors 145 and 147 digitally compare the return filtered signals with the untransmitted modulator drive signals $f_1$ and $f_2$ to produce binary coded phase values which are subsequently fed to a residue processor 149.

The residue processor 149 may take the form of a conventional programmable digital computer including a CPU, RAM, ROM, and I/O channels as shown in block form in FIG. 5. The ROM stores a program designed to implement the flowchart of FIG. 3. The digital processor may also be of a special purpose LSI fabrication suitable to provide the true range data for use in missile guidance, laser surveying and camera focusing applications as non-limiting examples.

In such a case or as an alternative to the CPU configuration in FIG. 5, hardwired logic circuitry may be devised in combination with a plurality of PROMs to perform the necessary data processing.

It should also be pointed out that with regard to FIGS. 4A and 4B that if sequential modulation of the carrier frequency is utilized, the bandpass filters 141 and 143 would not be required and only at least one phase detector circuit would be required inasmuch as the time separation of the modulated signals will serve to differentiate them.

What is claimed is:

1. Range determination apparatus for determining target range within a range depth of D and within a range bin error of e comprising:
   (a) a carrier frequency transmitter for transmitting a carrier frequency,
   (b) means for generating at least two modulating signals having frequency $f_1$ and $f_2$ respectively,
   (c) modulation means coupled to said carrier frequency transmitter for modulating said carrier, said modulation means operative for said at least two discrete frequencies $f_1$ and $f_2$ for providing one of simultaneous or sequential modulated signals,
   (d) said at least two modulating frequencies and a common sub-multiple counting frequency $f_o$ related such that $$f_o m_1' f_1 = m_2' f_2$$

where, $$m_1' = m_1 m_r$$

$$m_2' = m_2 m_r$$

$$m_r \geq 4e + 1$$

$$m_1 m_2 \geq D/m_r$$

and where $m_1, m_2$ and $m_r$ are pairwise relatively prime,
   (e) a receiver for receiving a reflected signal from said target and for producing a received electrical signal corresponding thereto,
   (g) phase detection means responsive to said modulating signals of said generating means and said received signals for detecting the phase difference $x_1'$ and $x_2'$ respectively between the modulating signals of frequencies $f_1$ and $f_2$ and each of the corresponding received signals,
   (h) data processing means coupled to receive said detected phase differences for each of said received signals, said data processing means operative
   (1) to calculate $$R(x_1')_{m_1}, R(x_2')_{m_2}$$
$$R(x_1')_{m_r}, R(x_2')_{m_r}$$

where $R(x)_m$ is defined as the residue of x modulo m,
   (2) to compare $R(x_1')_{m_r}$ with $R(x_2')_{m_r}$ and if unequal to modify at least one of $x_1'$ and $x_2'$ by adding or subtracting an integer $\leq e$ to produce modified phase differences $x_1''$ and $x_2''$ so that residues $R(x_1'')_{m_r}$ and $R(x_2'')_{m_r}$ of the modified phase differences are equal, and
   (3) to decode one of (1) the residue number triplet $[R(x_1')_{m_1}, R(x_2')_{m_2}, R(x_1')_{m_r}]$ and the modified residue number triplet $[R_1'')_{m_1}, R(x_2'')_{m_2}, R(x_1'')_{m_r}]$ relative to the moduli set $[m_1, m_2, m_r]$ to obtain the target range.

2. Range determination apparatus as recited in claim 1 wherein said data processing means comprises a programmable digital computer.

3. Range determination apparatus as recited in claim 1 wherein said carrier frequency transmitter comprises a laser.

4. Range determination apparatus as recited in claim 1 wherein said modulation means is operative to simultaneously modulate said carrier frequency.

5. Range determination apparatus as recited in claim 1 wherein said modulation means is operative to sequentially modulate said carrier frequency.

6. Range determination apparatus as recited in claim 1 wherein $f_o$ is about 500 MHz, $m_r = 5$, $f_1$ is about 5 MHz, and $f_2$ is about 2 MHz.

7. A method for determining the true target range within a range depth of D and within a range bin error of e from multiple pulse repetition frequencies of radar comprising the steps of:
   a. transmitting signals having at least two distinct frequencies $f_1$ and $f_2$,
   b. said frequencies related to each other and to a counting frequency $f_o$ such that $$m_1' f_1 = m_2' f_2 = f_o$$

where $$m_1' = m_1 m_r$$

$$m_2' = m_2 m_r$$

$$m_r \geq 4e + 1$$

$$m_1 m_2 \geq D/m_r$$

and where $m_1$, $m_2$ and $m_r$ are pairwise relatively prime,
   c. receiving reflected echo signals from said target for each frequency $f_1$ and $f_2$,
   d. detecting the difference in phase difference $x_2'$, $x_2'$ respectively between the transmitted and received signals for each frequency $f_1$ and $f_2$,
   e. calculating in response to said phase differences $x_1'$, $x_2'$ the residues, $$R(x_1')_{m_1} \quad , R(x_2')_{m_2}$$

$$R(x_1')_{m_r} \quad , R(x_2')_{m_r}$$

f. comparing $R(x_1')_{m_r}$ and $R(x_2')_{m_r}$, and if unequal, modifying at least one of $x_1'$ and $x_2'$ by adding or subtracting an integer $\geq e$ to produce a modified phase difference $x_1''$, $x_2''$ such that residues $R(x_1'')_{m_r}$ and $R(x_2'')_{m_r}$ of the modified phase differences are equal, and
   g. decoding one of (1) the residue number triplet $[R(x_1')_{m_1}, R(x_1')_{m_2}, R(x_1')_{m_r}]$ if $R(x_1')_{m_r}$ is equal to $R(x_2')_{m_r}$ in step f and (2) the modified residue number triplet $[R(x_1'')_{m_1}, R(x_2'')_{m_2}, R(x_1'')_{m_r}]$ if $R(x_1')_{m_r}$ is not equal to $R(x_2')_{m_r}$ in step f., each triplet decoded relative to the moduli set [$m_1$, $m_2$, $m_r$] to obtain the true target range.

8. A method for determining the true target range within a range depth D and within a range bin error e from multiple modulated frequencies of radar comprising the steps of:

(a) transmitting a plurality of distinct frequencies $f_1$, $f_2 \ldots f_i \ldots f_s$, (b) said plurality of frequencies related such that, for $i=1, 2, \ldots s$, $$m_1'f_1 = m_2'f_2 = m_i'f_i$$

where $$m_i' = m_i\, m_r$$
$$m_r \geq 4e + 1$$
$$\prod_{i=1}^{s} m_i \geq D/m_r$$

where the $m_i$'s are pairwise relatively prime, (c) receiving reflected echo signals from said target for each frequency $f_i$, $i=1,2,\ldots s$, (d) detecting the phase difference $x_1'$ respectively between the transmitted and received signals for each frequency $f_i$, $i=1,2\ldots s$, (e) calculating in response to each $x_1'$, the residues $$x_i = R(x_1')_{m_i}$$
$$x_i^r = R(x_1')_{m_r}\ i = 1,2,\ldots s,$$

(f) for each distinct pair of indices i,j where $i=1,2\ldots s$ and $j=1,2\ldots s$, computing, $$d(i,j) = min(R(x_i^r - x_j^r)_{m_r},\ m_r - R(x_i^r - x_j^r)_{m_r})$$

and choosing $i_o$, $j_o$ at which d $(i_o,j_o)$ is maximal, (g) selecting integer y, $o \geq y < m_r$ as one of:

$$y = R(x_{j_0}^r + [R(x_{i_0}^r - x_{j_0}^4)_{m_r}/2]_{m_r}$$

if $R(x_{i_0}^r - x_{j_0}^r)_{m_r} \geq 2e$, and $$y = R(x_{i_0}^r + [R(x_{j_0}^4 - x_{i_0}^r)_{m_r}/2])$$

if $R(x_{j_0}^r - x_{i_0}^r)_{m_r} \leq 2e$ when [ ] denotes the greatest integer functions, (h) computing $b_i$, $i=1,2,\ldots s$ such that $$b_i = R(x_i^r - y)_{m_r}\ \text{if}\ R(x_i^r - y)_{m_r} \leq e,$$

and $$b_i = R(x_i^r - y)_{m_r} - m_r\ \text{if}\ R(x_i^r - y)_{m_r} > e,$$

(i) subtracting $x_i - b_i$ to form the differences $$x_i^* = R(x_i - b_i)_{m_i}$$

$i=1,2,\ldots S$, and (j) decoding the set ($x_1^*, x_2^* \ldots x_i^* \ldots x_s^*, y$) relative to the moduli set ($m_1, m_2 \ldots m_i \ldots m_s, m_r$) to find the true target range.

9. Range determination apparatus is recited in claim 1 further comprising means for filtering each of said frequencies $f_1$ and $f_2$ from said received signal to provide corresponding filtered signals, and wherein said phase detection means is responsive to said filtered signals for detecting the phase difference $x_1'$ and $x_2'$ respectively between the modulating signals of frequencies $f_1$ and $f_2$ and each of the corresponding filtered signals.

* * * * *